(12) United States Patent
Bukovjan et al.

(10) Patent No.: US 12,483,428 B2
(45) Date of Patent: Nov. 25, 2025

(54) COMMUNICATION DEVICES FOR USE IN CHALLENGE-RESPONSE ROUNDS AND CORRESPONDING OPERATING METHODS

(71) Applicant: NXP B.V., Eindhoven (NL)

(72) Inventors: Peter Bukovjan, Graz (AT); Nikita Veshchikov, Brussels (BE)

(73) Assignee: NXP B.V., Eindhoven (NL)

( * ) Notice: Subject to any disclaimer, the term of this patent is extended or adjusted under 35 U.S.C. 154(b) by 149 days.

(21) Appl. No.: 18/488,609

(22) Filed: Oct. 17, 2023

(65) Prior Publication Data

US 2024/0163115 A1 May 16, 2024

(30) Foreign Application Priority Data

Nov. 15, 2022 (EP) .................................... 22207597

(51) Int. Cl.
*H04L 9/32* (2006.01)
*H04L 9/14* (2006.01)

(52) U.S. Cl.
CPC .............. *H04L 9/3271* (2013.01); *H04L 9/14* (2013.01)

(58) Field of Classification Search
CPC ....... H04L 9/3271; H04L 9/14; H04L 9/0861; H04L 9/002; H04L 9/003; H04L 9/16
See application file for complete search history.

(56) References Cited

U.S. PATENT DOCUMENTS 5,479,514 A * 12/1995 Klonowski ......... H04L 63/0435
380/47
8,411,854 B2 4/2013 Grzonkowski et al.
(Continued)

FOREIGN PATENT DOCUMENTS

| CN | 110493272 B | 10/2020 |
|---|---|---|
| CN | 114863589 A | 8/2022 |

(Continued)

OTHER PUBLICATIONS

Boureanu, Ioana et al.; "Optimal Proximity Proofs"; International Association for Cryptologic Research, Jan. 16, 2015, pp. 1-21, International Association for Cryptologic Research, Hyderabad, IN.
(Continued)

*Primary Examiner* — J. Brant Murphy (57) ABSTRACT

In accordance with a first aspect of the present disclosure, a communication device for use in one or more challenge-response rounds is provided, comprising: a response generation unit configured to generate, in each challenge-response round, a response to a challenge received from an external communication device, wherein said response is generated by performing a cryptographic function on said challenge, and wherein the cryptographic function takes said challenge and a cryptographic key as inputs; a key selection unit configured to select said cryptographic key from a set of cryptographic keys by executing a predefined key selection algorithm that has been shared with the external communication device. Further aspects of the present disclosure relate to another communication device for use in one of more challenge-response rounds, corresponding methods of operating communication devices, and computer programs for carrying out said methods.

19 Claims, 8 Drawing Sheets

(56) References Cited

U.S. PATENT DOCUMENTS

| | | | |
|---|---|---|---|
| 8,954,728 B1* | 2/2015 | Juels | H04L 9/0869 |
| | | | 713/155 |
| 9,154,480 B1* | 10/2015 | Juels | H04L 9/3271 |
| 10,469,260 B2 | 11/2019 | Hassan | |
| 10,887,107 B1* | 1/2021 | Chan | H04L 9/3271 |
| 10,915,888 B1* | 2/2021 | Rule | H04W 12/12 |
| 2006/0112273 A1* | 5/2006 | Tuyls | H04L 9/3218 |
| | | | 713/171 |
| 2007/0198837 A1* | 8/2007 | Koodli | H04W 12/0471 |
| | | | 713/153 |
| 2008/0104403 A1* | 5/2008 | Gueron | H04L 9/3247 |
| | | | 713/181 |
| 2010/0290618 A1* | 11/2010 | Slawomir | H04L 9/3073 |
| | | | 380/44 |
| 2016/0234008 A1* | 8/2016 | Hekstra | H04W 4/80 |
| 2018/0013559 A1* | 1/2018 | Hassan | H04L 9/0875 |
| 2019/0097794 A1* | 3/2019 | Nix | G06F 21/33 |
| 2021/0258174 A1* | 8/2021 | Schoinianakis | G06F 21/602 |
| 2021/0377057 A1* | 12/2021 | Poeppelmann | H04L 9/3273 |
| 2023/0038135 A1* | 2/2023 | Gowanlock | H04L 9/3278 |
| 2024/0008127 A1* | 1/2024 | Kanneath Abraham | |
| | | | H04W 4/60 |
| 2024/0072996 A1* | 2/2024 | Webb | H04L 9/0838 |
| 2024/0073004 A1* | 2/2024 | Burns | H04L 9/0861 |

FOREIGN PATENT DOCUMENTS

| | | |
|---|---|---|
| EP | 1011223 A1 | 6/2000 |
| JP | 4776378 B2 | 9/2011 |
| KR | 20150136957 A | 12/2015 |

OTHER PUBLICATIONS

Tomovic, Sinisa et al.; "A Protocol for Provably Secure Authentication of a Tiny Entity to a High Performance Computing One"; Mathematical Problems in Engineering; vol. 2016, Article ID 9289050; Received Dec. 25, 2015; Accepted Mar. 24, 2016; Published May 23, 2016; https://doi.org/10.1155/2016/9289050.

* cited by examiner

COMMUNICATION DEVICES FOR USE IN CHALLENGE-RESPONSE ROUNDS AND CORRESPONDING OPERATING METHODS

CROSS-REFERENCE TO RELATED APPLICATIONS

This application claims priority under 35 U.S.C. § 119 to European Patent Application No. 22207597.0, filed on Nov. 15, 2022, the contents of which are incorporated by reference herein.

TECHNICAL FIELD

The present disclosure relates to communication devices for use in one or more challenge-response rounds. Furthermore, the present disclosure relates to corresponding methods of operating communication devices for use in one or more challenge-response rounds, and to computer programs for carrying out said methods.

BACKGROUND

Authentication protocols are used to authenticate devices. Authentication is one of the main concepts in security and cryptography. Authentication allows to make sure that an entity with which communication is performed is genuine, authentic and is what or who it claims to be.

SUMMARY

In accordance with a first aspect of the present disclosure, a communication device for use in one or more challenge-response rounds is provided, comprising: a response generation unit configured to generate, in each challenge-response round, a response to a challenge received from an external communication device, wherein said response is generated by performing a cryptographic function on said challenge, and wherein the cryptographic function takes said challenge and a cryptographic key as inputs; a key selection unit configured to select said cryptographic key from a set of cryptographic keys by executing a predefined key selection algorithm that has been shared with the external communication device.

In one or more embodiments, the key selection algorithm includes selecting, in each challenge-response round, a different cryptographic key from said set of cryptographic keys.

In one or more embodiments, the key selection algorithm includes selecting the cryptographic key from a subset of the set of cryptographic keys, wherein the subset does not include all the cryptographic keys from said set.

In one or more embodiments, the key selection algorithm includes selecting the same cryptographic key for a predefined number of consecutive challenge-response rounds.

In one or more embodiments, the key selection algorithm is configured to select the cryptographic key from the set of cryptographic keys in a predefined order.

In one or more embodiments, said order depends on at least one of the following parameters: an identifier of the communication device, a randomization key, an authentication round.

In one or more embodiments, the set of cryptographic keys is generated by deriving the cryptographic keys from a master key.

In one or more embodiments, the communication device is configured to act as a prover in an authentication protocol.

In accordance with a second aspect of the present disclosure, a method of operating a communication device for use in one or more challenge-response rounds is conceived, the method comprising performing in each challenge-response round: selecting, by a key selection unit comprised in the communication device, a cryptographic key from a set of cryptographic keys by executing a predefined key selection algorithm that has been shared with an external communication device; generating, by a response generation unit comprised in the communication device, a response to a challenge received from the external communication device, wherein said response is generated by performing a cryptographic function on said challenge, and wherein the cryptographic function takes the challenge and the cryptographic key as inputs.

In accordance with a third aspect of the present disclosure, a computer program is provided, comprising executable instructions which, when executed by a communication device in accordance with the first aspect, carry out a method in accordance with the second aspect.

In accordance with a fourth aspect of the present disclosure, a communication device for use in one of more challenge-response rounds is provided, comprising: a response verification unit configured to verify, in each challenge-response round, a response transmitted by an external communication device, wherein said response is verified using a cryptographic key; a key selection unit configured to select said cryptographic key from a set of cryptographic keys by executing a predefined key selection algorithm that has been shared with the external communication device.

In one or more embodiments, the communication device is configured to act as a verifier in an authentication protocol.

In accordance with a fifth aspect of the present disclosure, a method of operating a communication device for use in one of more challenge-response rounds is conceived, the method comprising performing in each challenge-response round: selecting, by a key selection unit comprised in the communication device, a cryptographic key from a set of cryptographic keys by executing a predefined key selection algorithm that has been shared with an external communication device; verifying, by a response verification unit comprised in the communication device, a response transmitted by the external communication device, wherein said response is verified using the cryptographic key.

In accordance with a sixth aspect of the present disclosure, a computer program is provided, comprising executable instructions which, when executed by a communication device in accordance with the fourth aspect, carry out a method in accordance with the fifth aspect.

In accordance with a seventh aspect of the present disclosure, an authentication system configured to execute an authentication protocol is provided, the authentication system comprising a communication device in accordance with the first aspect, which is configured to act as a prover in said authentication protocol, and a communication device in accordance with the fourth aspect, which is configured to act as a verifier in said authentication protocol.

DESCRIPTION OF DRAWINGS

Embodiments will be described in more detail with reference to the appended drawings.

DESCRIPTION OF EMBODIMENTS

As mentioned above, authentication protocols are used to authenticate devices. Authentication is one of the main concepts in security and cryptography. Authentication allows to make sure that an entity with which communication is performed is genuine, authentic and is what or who it claims to be. Depending on the application it may be important to authenticate people, devices or data. In the context of the present disclosure, authentication specifically refers to an interactive authentication that is suitable for people and devices, but not for data. It is noted that in practice people will likely use a hardware device that will actually run the authentication protocol. Many of the interactive authentication protocols, such as the protocols based on zero-knowledge proofs, typically run multiple rounds of the authentication in one authentication session. Roughly speaking, one round only gives a weak indication that an authenticated entity is genuine, but repeating such rounds many times increases the certainty that the entity is genuine.

Side-channel attacks (SCAs) are attacks against implementations of security algorithms and protocols. SCAs rely on information leakage that a device accidentally produces. Usually, this information leakage can be measured by observing physical characteristics of the device such as power consumption. One of the most common types of SCAs is power analysis. The goal of an SCA is to retrieve some secret information that is manipulated by the device, most of the time the target of an SCA is a secret encryption key. Once a secret key is retrieved from the device, the attacker can use it to create a clone of the original device. More specifically, an almost identical hardware device can be provisioned with the retrieved secret key to act instead of the original. It is important to increase the resistance against such SCAs.

Figure 1A:
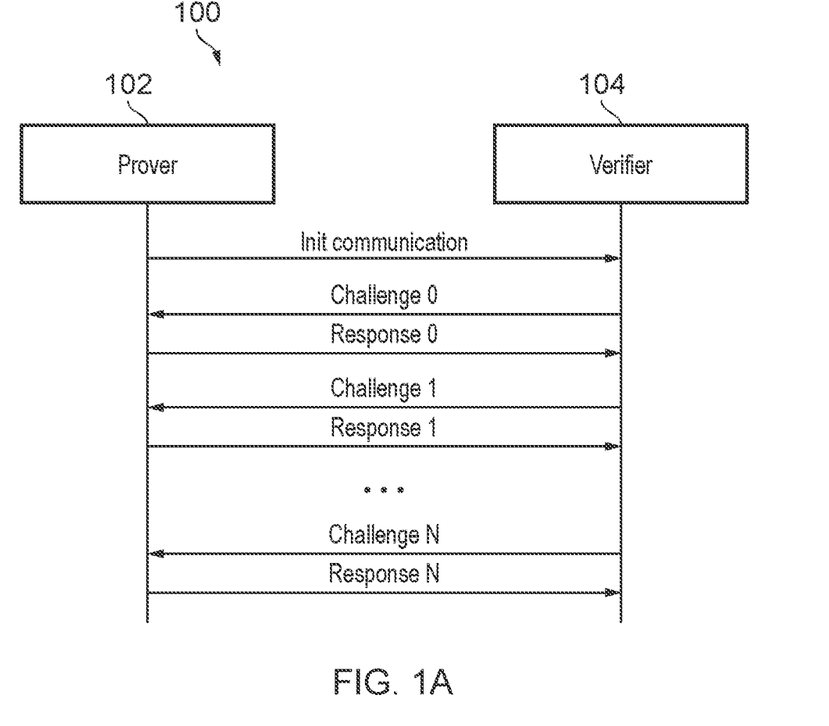
FIG. 1A shows an example of an authentication system.

FIG. 1A shows an example of an authentication system 100. The authentication system 100 comprises a first communication device that acts as a prover 102 and a second communication device that acts as a verifier 104. After an initial communication from the prover 102 to the verifier 104, the verifier 104 sends a first challenge to the prover 102. Subsequently, the prover 102 computes a response to the first challenge and transmits this response to the verifier 104. Then, the verifier 104 verifies the response, thereby completing a first challenge-response round. Subsequently, further challenge-response rounds are executed. In particular, a predefined number N of challenge-response rounds may be executed between the prover 102 and the verifier 104. More specifically, FIG. 1A shows a typical authentication session between two devices, fitting many cryptographic protocols. The number of challenge-response rounds (i.e., repetitions) depends on the level of certainty that one wants to achieve in the system. Often the number of rounds is suggested in protocol implementations for standard levels of security (e.g., 128-bit). The response to each challenge is computed using a secret key and the challenge itself.

Figure 1B:
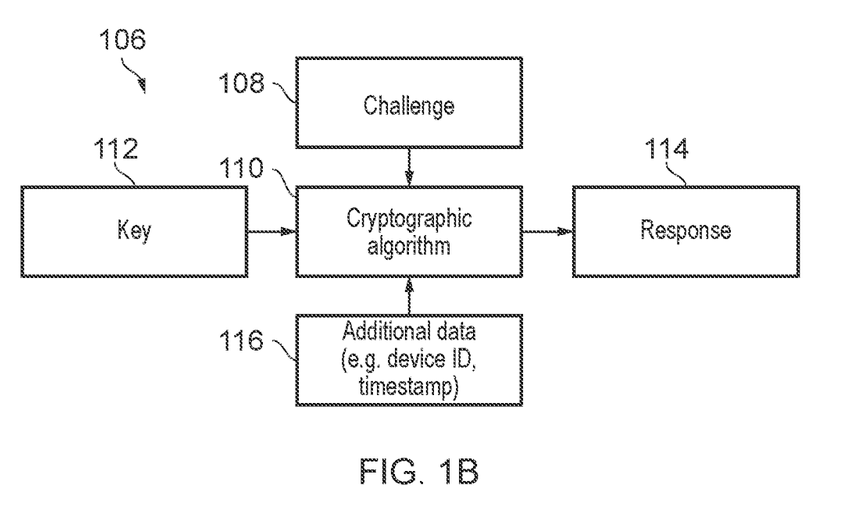
FIG. 1B shows an example of a response generation by a prover.

FIG. 1B shows an example of a response generation 106 by a prover. The response generation 106 includes executing a cryptographic algorithm 110 that takes a challenge 108 and a secret key 112 as inputs. Optionally, the cryptographic algorithm 110 may take additional data 116 as inputs, such as a device identifier and a timestamp. The cryptographic algorithm 110 outputs a response 114 to the challenge 108. In some scenarios the prover and the verifier exchange multiple challenges or responses in each message to reduce the communication overhead. For example, the verifier may send 10 challenges in one message and the prover may send the 10 corresponding responses as a reply in one message. In any case, the prover executes the cryptographic algorithm 110 for every challenge before sending the response or responses.

Now discussed are communication devices and corresponding operating methods, which facilitate increasing the resistance against side-channel attacks of the kind set forth. Furthermore, the presently disclosed techniques may facilitate increasing the resistance of the communication devices against cloning and reverse engineering. The communication devices and corresponding operating methods may be used to advantage in authentication systems which are configured to execute authentication protocols of the kind set forth above.

Figure 2A:
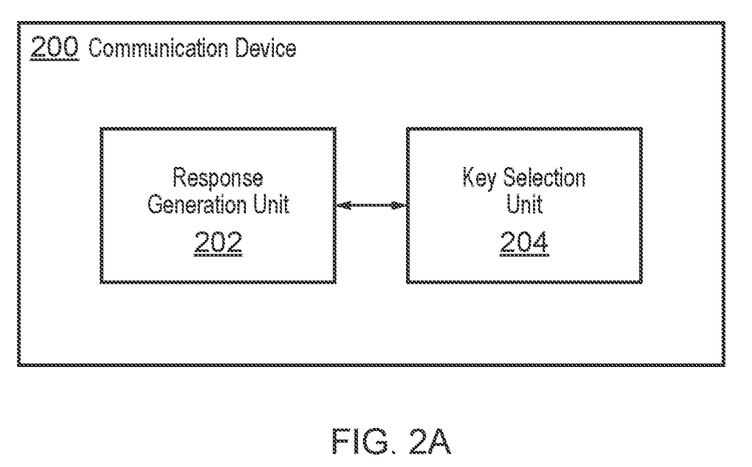
FIG. 2A shows an illustrative embodiment of a communication device.

FIG. 2A shows an illustrative embodiment of a communication device 200. The communication device 200 comprises a response generation unit 202 and a key selection unit 204, which are operatively coupled to each other. The response generation unit 202 is configured to generate, in each challenge-response round, a response to a challenge received from an external communication device (not shown), wherein said response is generated by performing a cryptographic function on said challenge, and wherein the cryptographic function takes said challenge and a cryptographic key as inputs. Furthermore, the key selection unit 204 is configured to select said cryptographic key from a set of cryptographic keys by executing a predefined key selection algorithm that has been shared with the external communication device. For example, the key selection algorithm may have been shared with the external communication device in a device configuration process, which is carried out prior to the authentication process. In a practical implementation, the communication device 200 is configured to act as a prover in an authentication protocol. In that case, the external communication device is configured to act as the verifier in said authentication protocol. By selecting the cryptographic key with which the response is computed from a set of cryptographic keys, in particular by executing a shared, predefined key selection algorithm, the resistance against side-channel attacks performed on the communication device may be increased.

In one or more embodiments, the key selection algorithm includes selecting, in each challenge-response round, a different cryptographic key from said set of cryptographic keys. In this way, the key diversity may be increased, which further facilitates increasing the resistance against side-channel attacks. Furthermore, the key selection algorithm includes selecting the cryptographic key from a subset of the set of cryptographic keys, wherein the subset does not include all the cryptographic keys from said set. Since not all available cryptographic keys are used, the difficulty may be increased for an attacker to analyze the behavior of the communication device. In other words, the resistance against side-channel attacks may be further increased. Furthermore, in one or more embodiments, the key selection algorithm includes selecting the same cryptographic key for a predefined number of consecutive challenge-response rounds. In this way, the key selection may be optimized, in the sense that less key switches are necessary. Still, the resistance against side-channel attacks may be increased by, for example, selecting different keys in challenge-response rounds different from the consecutive rounds.

Figure 3:
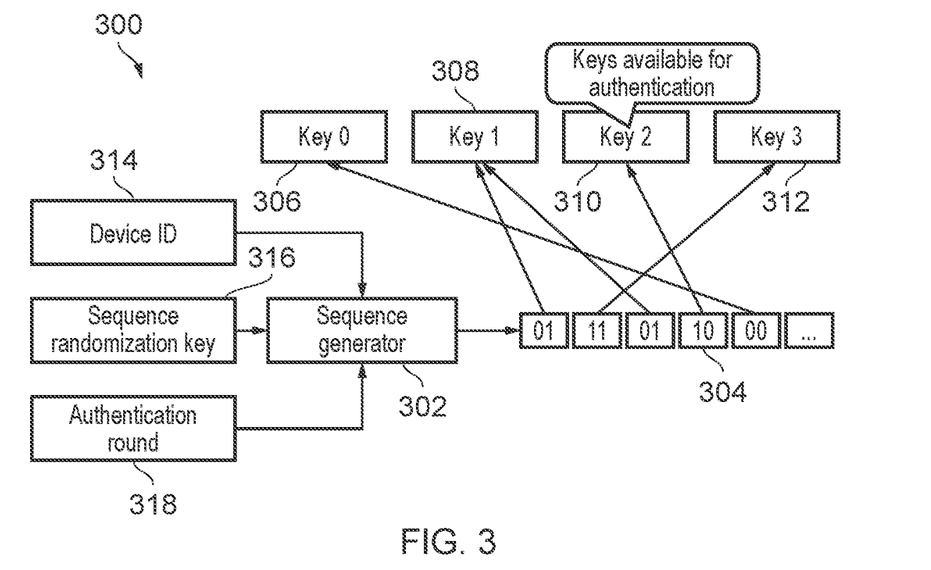
FIG. 3 shows an illustrative embodiment of a key selection algorithm.

In a practical implementation, the key selection algorithm is configured to select the cryptographic key from the set of cryptographic keys in a predefined order. Furthermore, in one or more embodiments, said order depends on at least one of the following parameters: an identifier of the communication device, a randomization key, an authentication round (i.e., a challenge-response round). This may further increase the difficulty for an attacker to retrieve the cryptographic keys used during the challenge-response rounds. Accordingly, the resistance against side-channel attacks may be further increased. In particular, it may not be desirable to repeat the sequences of the key selection (i.e., their order) from one device to another, so it is helpful to use the device identifier as one of the parameters for generating the sequence of keys to use. Similarly, the randomization key and the authentication round can be use as auxiliary information to parametrize the sequence of keys. Using these additional parameters may help in case the attacker knows the algorithm and even the authentication keys. For example, without the randomization key he will still not be able to predict the sequence of the keys that are used. If a different device identifier is used in every device then, even by knowing something about the order of keys in one device, the attacker will not know anything about the order in another device given that everything else is the same. In a practical implementation, a hash function may be used. For example, a hash value may be computed on the device identifier, randomization key and other information, which may subsequently be used in the randomization algorithm that computes the sequences of keys to be used. It is noted that this practical implementation is illustrated in FIG. 3. Furthermore, in one or more embodiments, the set of cryptographic keys is generated by deriving the cryptographic keys from a master key. In this way, there is no need for a significantly larger storage space in the communication device, while it is still possible to obtain a plurality of cryptographic keys.

Figure 2B:
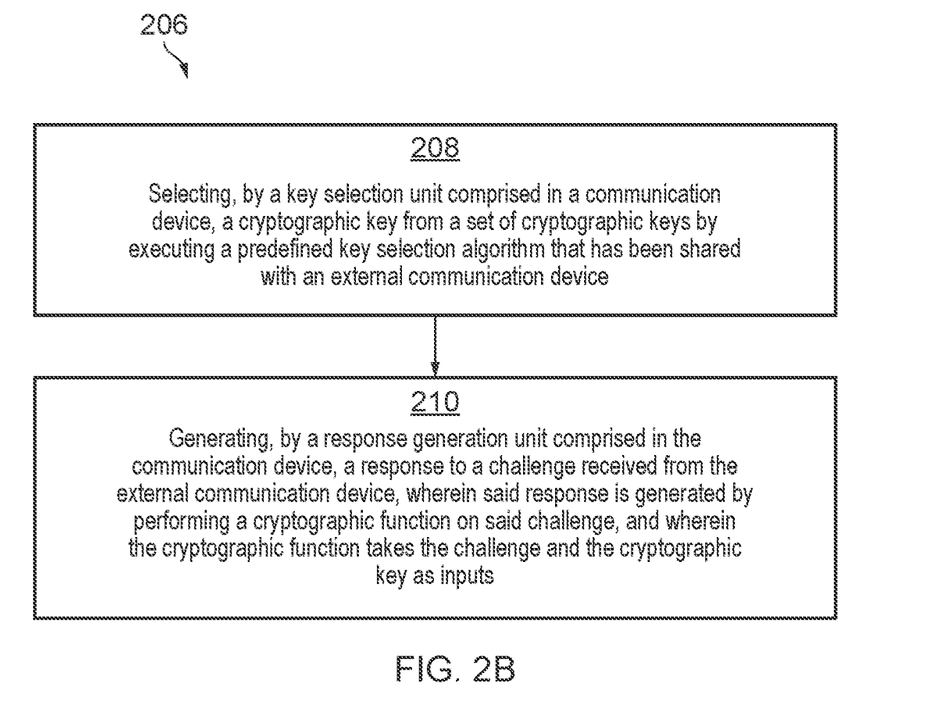
FIG. 2B shows an illustrative embodiment of a method of operating a communication device.

FIG. 2B shows an illustrative embodiment of a method 206 of operating a communication device, more specifically a method of operating the communication device shown in FIG. 2A. The method 206 comprises performing the following steps in each challenge-response round. At 208, a key selection unit comprised in the communication device selects a cryptographic key from a set of cryptographic keys by executing a predefined key selection algorithm that has been shared with an external communication device. Furthermore, at 210, a response generation unit comprised in the communication device generates a response to a challenge received from the external communication device, wherein said response is generated by performing a cryptographic function on said challenge, and wherein the cryptographic function takes the challenge and the cryptographic key as inputs.

Figure 2C:
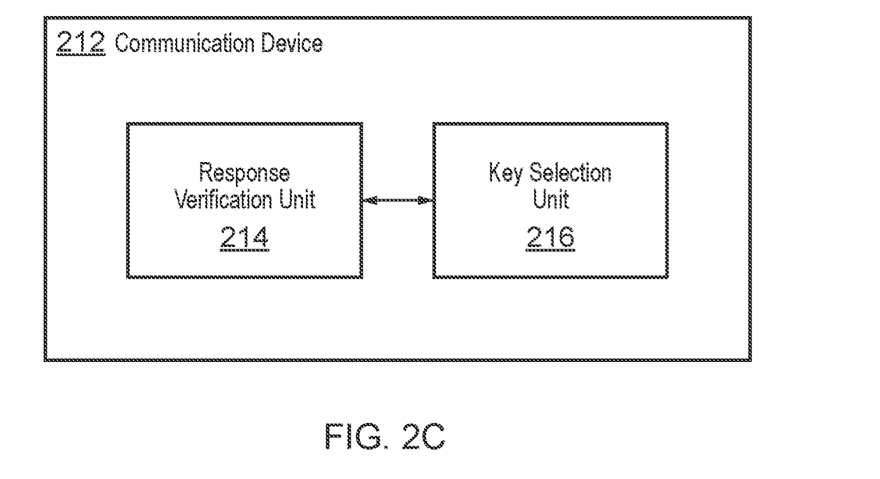
FIG. 2C shows another illustrative embodiment of a communication device.

FIG. 2C shows another illustrative embodiment of a communication device 212. The communication device 212 comprises a response verification unit 214 and a key selection unit 216, which are operatively coupled to each other. The response verification unit 214 is configured to verify, in each challenge-response round, a response transmitted by an external communication device (not shown), wherein said response is verified using a cryptographic key. Furthermore, the key selection unit 216 is configured to select said cryptographic key from a set of cryptographic keys by executing a predefined key selection algorithm that has been shared with the external communication device. For example, the key selection algorithm may have been shared with the external communication device in a device configuration process, which is carried out prior to the authentication process. In a practical implementation, the communication device 212 is configured to act as a verifier in an authentication protocol. In that case, the external communication device is configured to act as the prover in said authentication protocol. As mentioned above, by selecting the cryptographic key with which the response is computed from a set of cryptographic keys, in particular by executing a shared, predefined key selection algorithm, the resistance against side-channel attacks performed on the communication device may be increased.

Figure 2D:
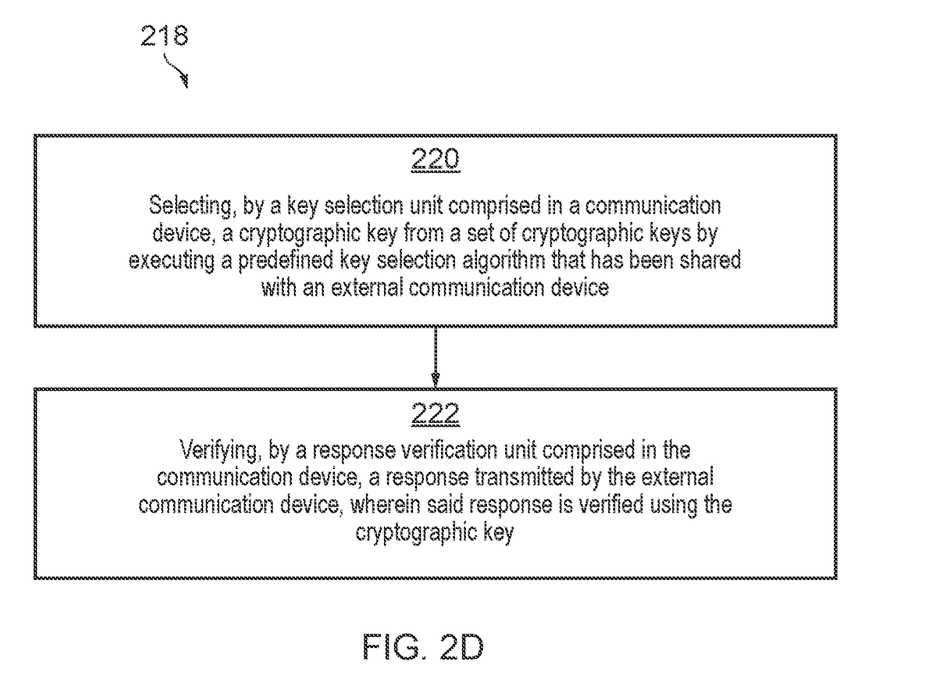
FIG. 2D shows another illustrative embodiment of a method of operating a communication device.

FIG. 2D shows another illustrative embodiment of a method 218 of operating a communication device, more specifically a method of operating the communication device shown in FIG. 2C. The method 218 comprises performing the following steps in each challenge-response round. At 220, a key selection unit comprised in the communication device selects a cryptographic key from a set of cryptographic keys by executing a predefined key selection algorithm that has been shared with an external communication device. Furthermore, at 222, a response verification unit comprised in the communication device verifies a response transmitted by the external communication device, wherein said response is verified using the cryptographic key.

FIG. 3 shows an illustrative embodiment of a key selection algorithm 300. The key selection algorithm 300 is implemented as a sequence generator 302, which generates a sequence 304. The sequence of keys 304 includes binary numbers, which uniquely identify one of a plurality of cryptographic keys 306, 308, 310, 312. Thus, the cryptographic keys used for the consecutive challenge-response rounds are selected in accordance with the binary numbers included in the sequence 304. Optionally, the sequence generator 302 may take into account a device identifier 314, a sequence randomization key 316 and an authentication round 318, in order to generate the sequence 304. Using the sequence randomization key 316, it may be ensured that the order in which the keys are selected is randomized. It is noted that from the point of view of communications there is no change in the way the challenge-response rounds are carried out, compared to the standard protocol as shown in FIG. 1A. Thus, for an attacker the communication devices are executing the exact same protocols and steps. For instance, the same sizes of keys may be used, the same number of rounds and the same cryptographic algorithm (these are typically easily observable by an analyst), so it is not straightforward to distinguish the presently disclosed response generation from a standard non-modified one.

In accordance with the present disclosure, a prover and a verifier in an authentication system may share a common key selection algorithm. This algorithm may also use a secret key, and it may be based on well-known cryptographic algorithms such as random number generators, stream ciphers, etc. The goal of this algorithm is to choose a key that is supposed to be used in a challenge-response round of the authentication protocol. An example of the key selection scheme is shown in FIG. 3. In this example, the sequence of keys 304 to be used depends on the device ID 314, a secret key 316 shared between prover and verifier and the round 318 of the authentication. This example shows a scheme with 4 available keys 306, 308, 310, 312 and thus one would take 2 bits at a time from the sequence generator 302 to select a key. Once the key is selected it will be the one used to compute the response for the challenge that the verifier sent to the prover. It is noted that the verifier will also know all the information required to compute the key number that is supposed to be used for this round.

The skilled person will appreciate that the sequence generator 302 can be based on a stream cipher, a block cipher in (for example) a counter mode, a pseudorandom number generator (PRNG) or a sponge construction (such as Keccak). It is noted that the three parameters 314, 316, 318 in FIG. 3 are optional. For instance, the sequence does not have to be dependent on the authentication round 318. Furthermore, other parameters can be included, such as the date, in order to randomize the sequence every day. Furthermore, one can also include a random number, for example as provided by the verifier in its first response when the prover initiated the communication.

Figure 4:
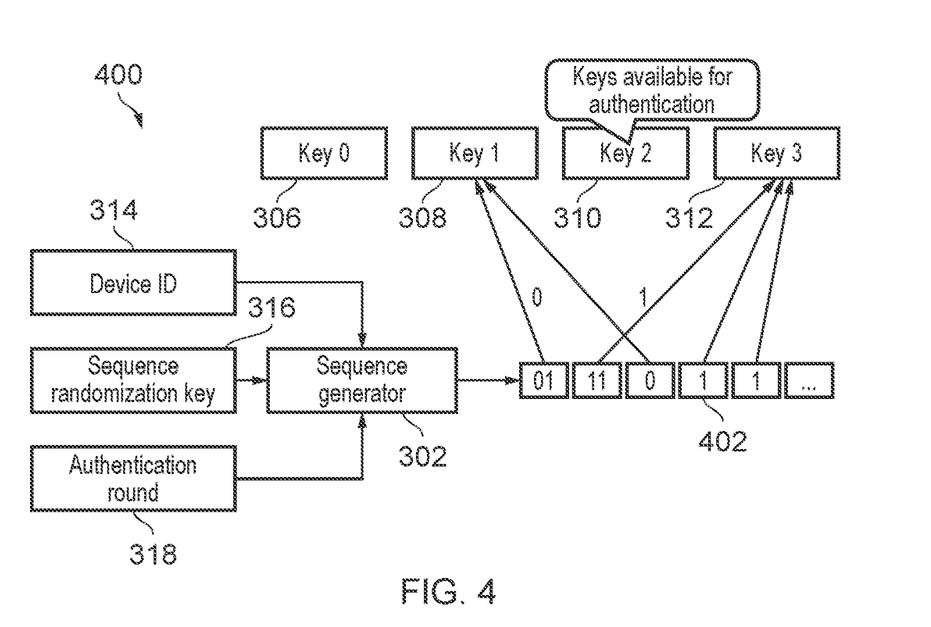
FIG. 4 shows another illustrative embodiment of a key selection algorithm.

FIG. 4 shows another illustrative embodiment of a key selection algorithm 400. The key selection algorithm 400 is similar to the key selection algorithm 300 shown in FIG. 3. Again, the key selection algorithm 300 is implemented as a sequence generator 302, which generates a sequence 304. However, in this example not all of the available cryptographic keys 306, 308, 310, 312 are used in the challenge-response rounds. In other words, the key selection algorithm 400 includes selecting the cryptographic key from a subset 308, 310 of the set of cryptographic keys 306, 308, 310, 312, wherein the subset does not include all the cryptographic keys 306, 308, 310, 312 from said set. This may make it more difficult for an attacker to analyze the behavior of the communication device and extract the keys used for the challenge-response rounds. The first two binary numbers of the sequence 402 indicate which of the available keys can be selected: the second key 308 and the fourth key 312. Then, the remaining binary numbers of the sequence 402, consisting of only a single bit, indicate whether the second key 308 or the fourth key 312 should be selected.

Accordingly, using the presently disclosed technique it may either be possible to use all of the available keys in a random order for every authentication, or to use only a subset of the available keys. It is noted that it is unlikely that one of the keys does not get to be used if the output of the sequence generator is uniform and the number of keys is much smaller than the number of rounds. This means that during one authentication session all keys will get to be used and will be "visible" in for example a power trace for the analysis. However, it is possible to ensure that not all keys are used on every authentication, thus making it more difficult to analyze the communication device and extract them. To do so, one might either use two separate key selection functions or handle the first few bits of the output of the key selection function (i.e., the sequence generator) differently. An example is shown in FIG. 4, where only two keys are used for the authentication session among the four available ones. To accomplish this, first bits of the sequence generator are used to select a subset of the keys (2 out of 4 in this example) and remaining bits are used to select the keys out of the subset.

As mentioned above, in some embodiments the key selection algorithm includes selecting the same cryptographic key for a predefined number of consecutive challenge-response rounds. In other words, it is possible to optimize the scheme to have les key switches, for example by using the same key N times instead of once before selecting a next one. However, if the attacker knows about this property than it will be easier for him to distinguish the keys from each other. Furthermore, it is noted that an authentication protocol may consist of only a single challenge-response round. In that case, the presently disclosed technique may still be used, in the sense that only one cryptographic key will be selected from the set of available keys. Subsequently, the selected cryptographic key may be used in the challenge-response round. Furthermore, it is noted that even if an attacker knows that the presently disclosed technique is used, he or she will have to extract all keys to be able to clone the communication device, including the sequence randomization key to be able to predict which key to use next. This last task can be very challenging, especially if the sequence generator algorithm and/or its parameters are not known to the attacker.

Figure 5:
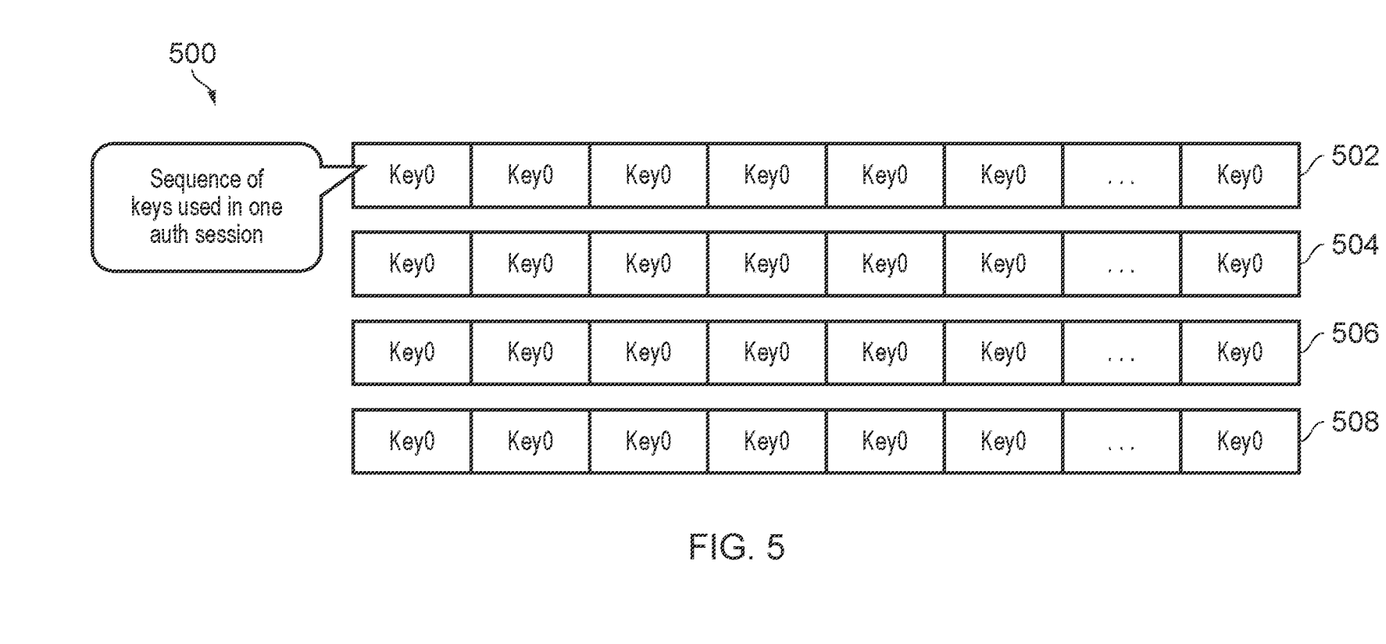
FIG. 5 shows examples of sequences of keys.

FIG. 5 shows examples of sequences of keys 500. In particular, the first sequence 502, second sequence 504, third sequence 506 and fourth sequence 508 are the same, and the same key is used repeatedly within each sequence. It is noted that the first sequence 502 is used in a first authentication session consisting of multiple challenge-response rounds, the second sequence 504 is used in a second authentication session consisting of multiple challenge-response rounds, etc. In other words, in this typical authentication protocol only a single key is used for all authentication sessions, and for all challenge-response rounds within said authentication sessions. It is noted that the sequences 502, 504, 506, 508 also correspond to the series of observable leakages (e.g., as visible through side-channels). In theory, a strong attacker will be able to extract the single key from the data recovered (e.g., a power trace) from a single authentication session in a standard implementation.

Figure 6:
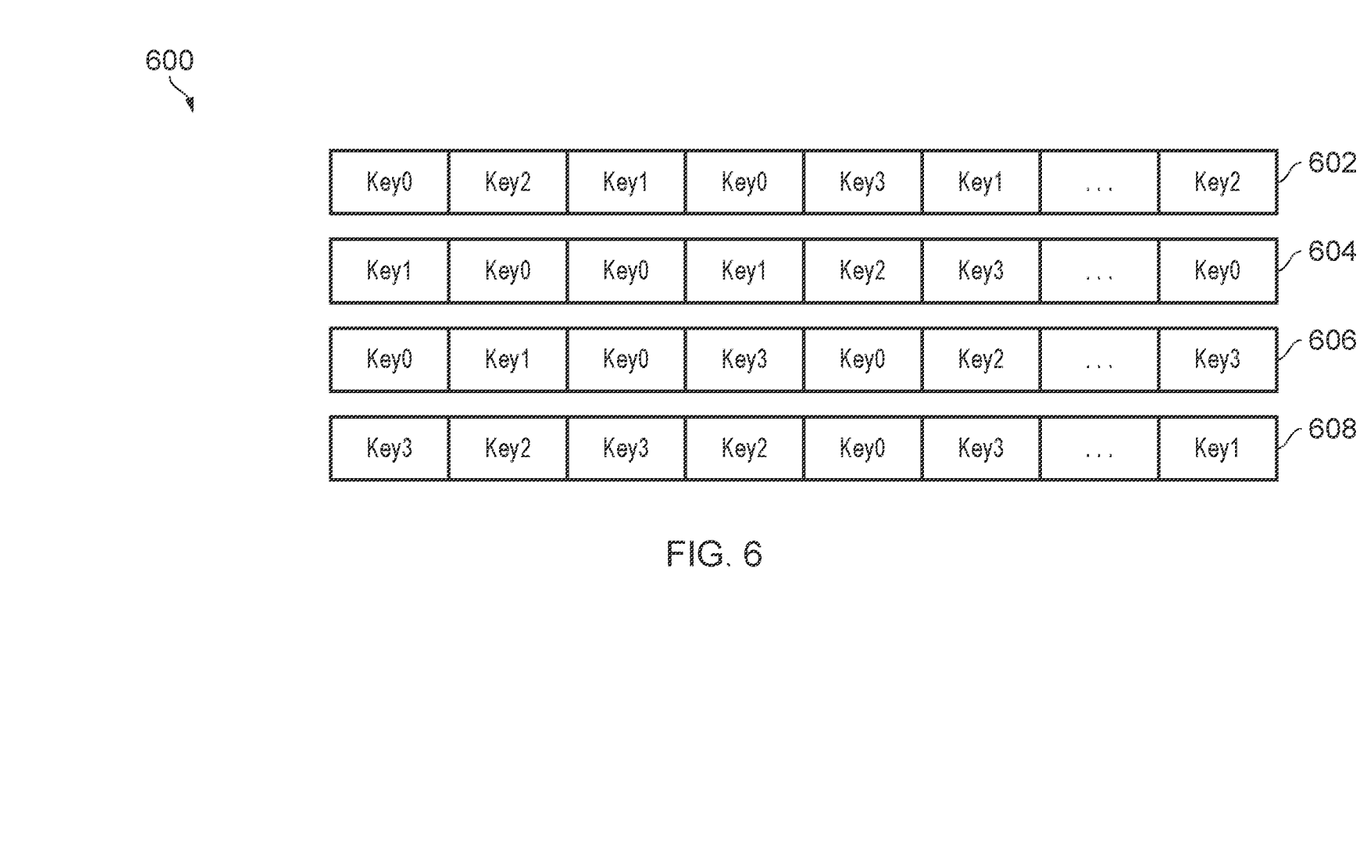
FIG. 6 shows illustrative embodiments of sequences of keys.

FIG. 6 shows illustrative embodiments of sequences of keys 600. In particular, the use of a key selection algorithm in accordance with the present disclosure is shown. The first sequence 602, which is used in a first authentication session, includes different keys for each challenge-response round. These keys are selected by the key selection algorithm. Similarly, the second sequence 604, which is used in a second authentication session, keys for each challenge-response round, etc. In other words, in this authentication protocol different keys are used for the challenge-response rounds in each authentication session. Furthermore, the order in which the keys are used differs for each authentication session. In this way, the resistance against side-channel attacks may be increased.

Figure 7:
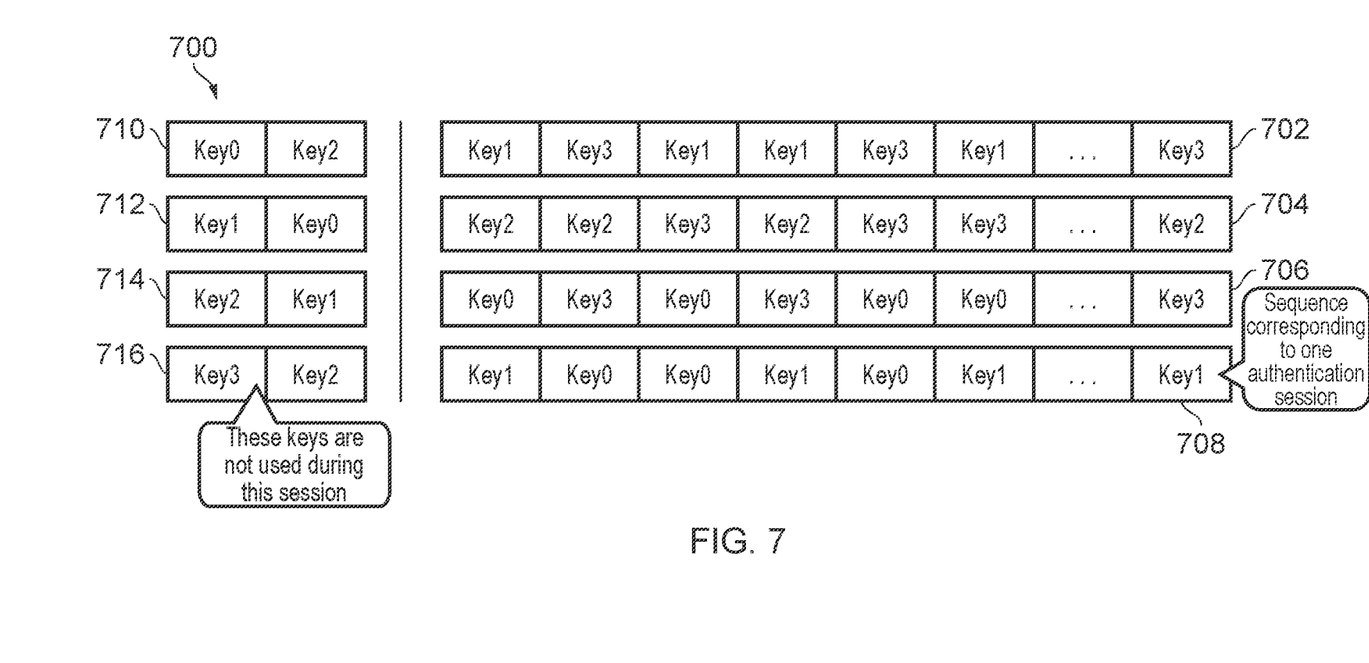
FIG. 7 shows further illustrative embodiments of sequences of keys.

FIG. 7 shows further illustrative embodiments of sequences of keys 700. In particular, the use of a key selection algorithm in accordance with the present disclosure is shown. The first sequence 702, which is used in a first authentication session, includes different keys for each challenge-response round. These keys are selected by the key selection algorithm. Similarly, the second sequence 704, which is used in a second authentication session, keys for each challenge-response round, etc. In other words, in this authentication protocol different keys are used for the challenge-response rounds in each authentication session. Furthermore, the order in which the keys are used differs for each authentication session. In addition, in each authentication session only a subset of the available keys is used. In particular, for each authentication session, some keys 710, 712, 714, 716 remain unused, in the sense that they are not selected by the key selection algorithm. In this way, the resistance against side-channel attacks may be further increased. In particular, if only subsets of keys are used each time even a very strong attacker will need many authentication sessions and a way to distinguish different keys, in addition to having to recover the sequence randomization key and parameters.

Figure 8:
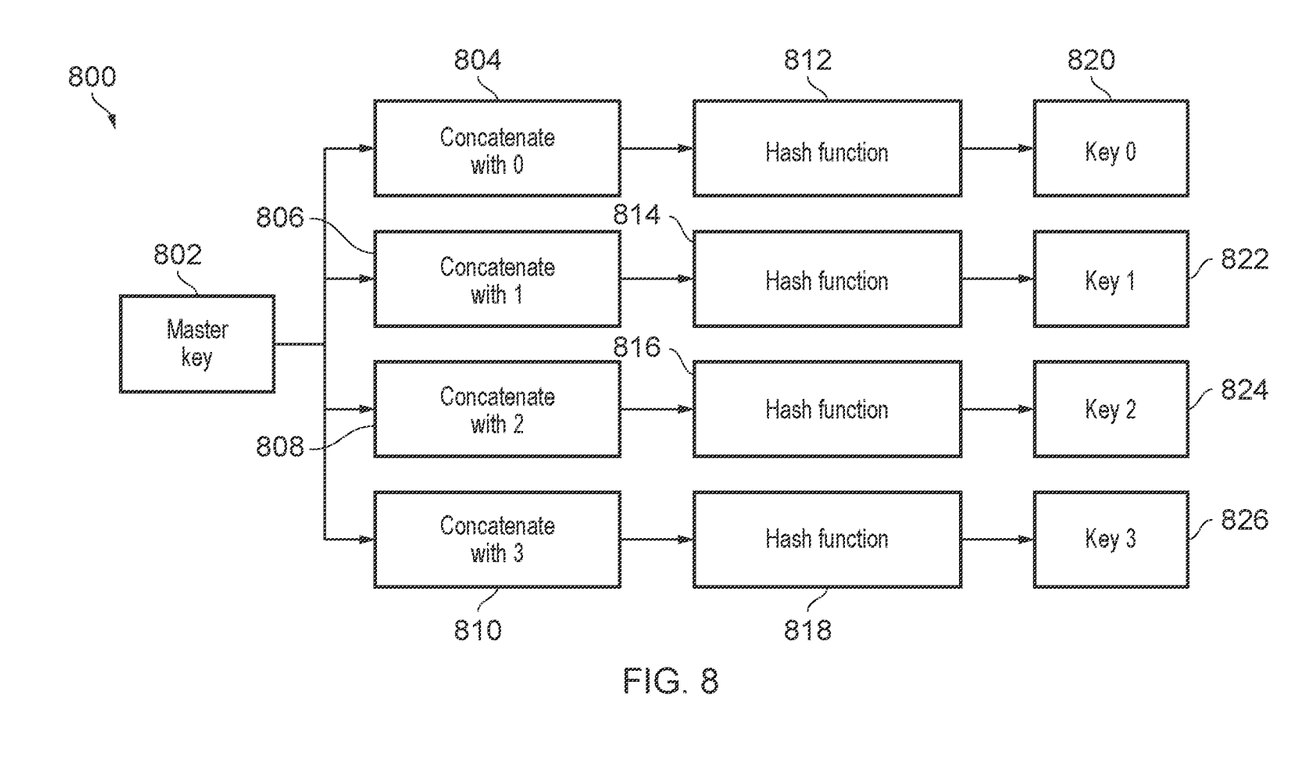
FIG. 8 shows an illustrative embodiment of a key generation process.

FIG. 8 shows an illustrative embodiment of a key generation process 800. The key generation process 800 generates a set of cryptographic keys 820, 822, 824, 826 by deriving said cryptographic keys 820, 822, 824, 826 from a master key 802. As mentioned above, this reduces the need for a significantly larger storage space in the communication device, while it is still possible to obtain a plurality of cryptographic keys 820, 822, 824, 826. In order to derive said cryptographic keys 820, 822, 824, 826 from the master key 802, the master key 802 is first concatenated 804, 806, 808, 810 with predefined numbers, and then hash functions 812, 814, 816, 818 are performed on the results of the concatenations 804, 806, 808, 810. By deriving the cryptographic keys 820, 822, 824, 826 from the master key 802, a cost trade-off may be achieved between execution time and memory space. For example, instead of generating 4 keys, one would have to generate a single master key K M 802. The master key 802 can be used to generate the required 4 keys 820, 822, 824, 826 at the beginning of the authentication process. The skilled person will appreciate that this may be done in many different ways, using various key derivation functions (i.e., key generation functions). It is possible to use a stream cipher or a hash function to generate the required keys 820, 822, 824, 826 for the authentication, as is shown in FIG. 8. It is noted that the specific key generation process 800 shown in FIG. 8 is useful for optimizing the scenario in which only of a subset of the cryptographic keys is used, as explained with reference to FIG. 7. In that case, only the required keys should be generated, but not all the keys.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 authentication system
102 prover
104 verifier
106 response generation by a prover
108 challenge
110 cryptographic algorithm
112 cryptographic key
114 response
116 additional data
200 communication device
202 response generation unit
204 key selection unit
206 method of operating a communication device
208 selecting, by a key selection unit comprised in a communication device, a cryptographic key from a set of cryptographic keys by executing a predefined key selection algorithm that has been shared with an external communication device
210 generating, by a response generation unit comprised in the communication device, a response to a challenge received from the external communication device, wherein said response is generated by performing a cryptographic function on said challenge, and wherein the cryptographic function takes the challenge and the cryptographic key as inputs
212 communication device
214 response verification unit
216 key selection unit
218 method of operating a communication device
220 selecting, by a key selection unit comprised in a communication device, a cryptographic key from a set of cryptographic keys by executing a predefined key selection algorithm that has been shared with an external communication device
222 verifying, by a response verification unit comprised in the communication device, a response transmitted by the external communication device, wherein said response is verified using the cryptographic key
300 key selection algorithm
302 sequence generator
304 sequence of keys
306 key 0
308 key 1
310 key 2
312 key 3
314 device identifier
316 sequence randomization key
318 authentication round
400 key selection algorithm
402 sequence of keys
500 sequences of keys
502 first sequence
504 second sequence
506 third sequence
508 fourth sequence
600 sequences of keys
602 first sequence
604 second sequence
606 third sequence
608 fourth sequence
700 sequences of keys
702 first sequence
704 second sequence
706 third sequence
708 fourth sequence
710 unused keys
712 unused keys
714 unused keys
716 unused keys
800 key generation process
802 master key
804 concatenate with 0
806 concatenate with 1
808 concatenate with 2
810 concatenate with 3
812 hash function
814 hash function
816 hash function
818 hash function
820 key 0
822 key 1
824 key 2
826 key 3

The invention claimed is:

1. A communication device for use in one or more challenge-response rounds, comprising:
a key selection unit configured to:
execute a predefined key selection algorithm that has been shared with an external communication device;
generate a set of cryptographic keys according to the key selection algorithm; and
select a cryptographic key from the set of cryptographic keys; and
a response generation unit coupled to the key selection unit and configured to:
receive the selected cryptographic key from the key selection unit;
receive a challenge from the external communication device;
perform a cryptographic function utilizing the received challenge and the selected cryptographic key; and
generate, in each challenge-response round, a response based on the performed cryptographic function.

2. The communication device of claim 1, wherein selecting the cryptographic key comprises selecting a different cryptographic key from the set of cryptographic keys for each challenge-response round.

3. The communication device of claim 1, wherein selecting the cryptographic key comprises selecting the cryptographic key from a subset of the set of cryptographic keys, wherein the subset does not include all the cryptographic keys from the set.

4. The communication device of claim 1, wherein selecting the cryptographic key comprises selecting the same cryptographic key from the set of cryptographic keys for a predefined number of consecutive challenge-response rounds.

5. The communication device of claim 1, wherein selecting the cryptographic key comprises selecting the cryptographic key from the set of cryptographic keys in a predefined order.

6. The communication device of claim 5, wherein the predefined order depends on at least one of the following parameters: an identifier of the communication device, a randomization key, and an authentication round.

7. The communication device of claim 1, wherein generating the set of cryptographic keys comprises deriving the cryptographic keys from a master key.

8. The communication device of claim 1, wherein the communication device acts as a prover in an authentication protocol.

9. A method of operating a communication device for use in one or more challenge-response rounds, the method comprising performing in each challenge-response round:
- executing a predefined key selection algorithm that has been shared with an external communication device;
- generating a set of cryptographic keys according to the key selection algorithm;
- selecting a cryptographic key from the set of cryptographic keys;
- receiving a challenge from the external communication device;
- performing a cryptographic function utilizing the received challenge and the selected cryptographic key;
- generating a response based on the performed cryptographic function; and
- transmitting the response to the external communication device.

10. The method of claim 9, wherein the method is embodied in a computer program comprising executable instructions stored in a non-transitory medium which, when executed by a communication device, performs the method.

11. A communication device for use in one or more challenge-response rounds, comprising:
- a key selection unit configured to:
  - execute a predefined key selection algorithm that has been shared with an external communication device;
  - generate a set of cryptographic keys according to the key selection algorithm; and
  - select a cryptographic key from the set of cryptographic keys; and
- a response verification unit configured to:
  - receive a response from the external communication device; and
  - verify, for each challenge-response round, the response using the selected cryptographic key.

12. The communication device of claim 11, wherein selecting the cryptographic key comprises selecting, in each challenge-response round, a different cryptographic key from said set of cryptographic keys.

13. The communication device of claim 11, wherein selecting the cryptographic key comprises selecting the cryptographic key from a subset of the set of cryptographic keys, wherein the subset does not include all the cryptographic keys from said set.

14. The communication device of claim 11, wherein selecting the cryptographic key comprises selecting the cryptographic key for a predefined number of consecutive challenge-response rounds.

15. The communication device of claim 11, wherein selecting the cryptographic key comprises selecting the cryptographic key from the set of cryptographic keys in a predefined order.

16. The communication device of claim 15, wherein the predefined order depends on at least one of the following parameters: an identifier of the communication device, a randomization key, and an authentication round.

17. The communication device of claim 11, wherein the communication device acts as a verifier in an authentication protocol.

18. A method of operating a communication device for use in one of more challenge-response rounds, the method comprising performing in each challenge-response round:
- executing a predefined key selection algorithm that has been shared with an external communication device;
- generating a set of cryptographic keys according to the key selection algorithm;
- selecting a cryptographic key from the set of cryptographic keys;
- receiving a response from the external communication device; and
- verifying, for each challenge-response round, the response using the selected cryptographic key.

19. The method of claim 18, wherein the method is implemented as a computer program comprising executable instructions stored in a non-transitory medium which, when executed by a communication device performs the method.

* * * * *